United States Patent
Swope et al.

(10) Patent No.: US 10,930,001 B2
(45) Date of Patent: Feb. 23, 2021

(54) DATA CAPTURE SYSTEM AND METHOD FOR OBJECT DIMENSIONING

(71) Applicant: Zebra Technologies Corporation, Lincolnshire, IL (US)

(72) Inventors: Charles Burton Swope, Coral Springs, FL (US); Miguel X. Gines, Deerfield, FL (US); Stanko Jelavic, Davie, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 176 days.

(21) Appl. No.: 15/991,575

(22) Filed: May 29, 2018

(65) Prior Publication Data

US 2019/0370990 A1 Dec. 5, 2019

(51) Int. Cl.
*G06T 7/593* (2017.01)
*G06T 7/62* (2017.01)
(Continued)

(52) U.S. Cl.
CPC .......... *G06T 7/596* (2017.01); *G06F 16/1734* (2019.01); *G06T 7/62* (2017.01);
(Continued)

(58) Field of Classification Search
CPC . G06T 7/596; G06T 7/62; G06T 17/00; G06F 16/1734; G06F 17/30144; H04N 5/2251–2256
See application file for complete search history.

(56) References Cited

U.S. PATENT DOCUMENTS 6,476,812 B1 11/2002 Yoshigahara et al.
7,660,436 B2 2/2010 Chang et al.
(Continued)

FOREIGN PATENT DOCUMENTS

| CN | 109632033 A | 4/2019 |
| JP | H0882678 A | 3/1996 |
| WO | 2017/056035 A1 | 4/2017 |

OTHER PUBLICATIONS

International Search Report and Written Opinion for International Application No. PCT/US2019/034674 dated Aug. 22, 2019.
(Continued)

*Primary Examiner* — Michael S Osinski
(74) *Attorney, Agent, or Firm* — Yuri Astvatsaturov (57) ABSTRACT

A data capture system for object dimensioning includes: a motion sensor configured to generate a detection signal responsive to detecting an object at a capture position within a capture volume; a capture controller connected to the motion sensor and configured, responsive to receiving the detection signal, to generate and transmit a shutter command substantially simultaneously to each of a plurality of cameras that causes each camera to capture a respective image of a synchronous set of images of the capture volume; an image processing server connected to each of the plurality of cameras and configured to receive the synchronous set of images from the cameras, and to store the synchronous set of images in a common repository; the image processing server further configured to generate a point cloud representing the object based on the synchronous set of images, for use in determining dimensions of the object.

16 Claims, 6 Drawing Sheets

(51) Int. Cl.
*G06F 16/17* (2019.01)
*G06T 17/00* (2006.01)
*H04N 5/225* (2006.01)

(52) U.S. Cl.
CPC ........... *G06T 17/00* (2013.01); *H04N 5/2251* (2013.01); *H04N 5/2256* (2013.01)

(56) References Cited

U.S. PATENT DOCUMENTS

| | | | | |
|---|---|---|---|---|
| 9,170,090 | B2* | 10/2015 | Hansen | G01B 11/026 |
| 9,478,030 | B1* | 10/2016 | Lecky | G06K 9/4604 |
| 10,028,102 | B2 | 7/2018 | Modica et al. | |
| 10,290,115 | B2* | 5/2019 | Baumgartner | G01B 11/04 |
| 10,587,858 | B2* | 3/2020 | Zolotov | G06K 9/6267 |
| 2004/0023612 | A1 | 2/2004 | Kriesel | |
| 2005/0232463 | A1 | 10/2005 | Hirvonen et al. | |
| 2010/0305857 | A1 | 12/2010 | Byrne et al. | |
| 2012/0092504 | A1* | 4/2012 | Murphy | G03B 17/02 |
| | | | | 348/159 |
| 2013/0002832 | A1* | 1/2013 | Lasenby | A61B 5/0064 |
| | | | | 348/51 |
| 2013/0293539 | A1* | 11/2013 | Hunt | G01B 11/00 |
| | | | | 345/420 |
| 2013/0293540 | A1* | 11/2013 | Laffargue | G06T 17/20 |
| | | | | 345/420 |
| 2014/0002446 | A1 | 1/2014 | Hendricks | |
| 2014/0267703 | A1* | 9/2014 | Taylor | G06T 7/73 |
| | | | | 348/139 |
| 2015/0062305 | A1* | 3/2015 | Murayama | G01B 11/043 |
| | | | | 348/48 |
| 2015/0187091 | A1* | 7/2015 | Hata | G01B 11/02 |
| | | | | 382/101 |
| 2015/0213647 | A1* | 7/2015 | Laffargue | G06T 17/20 |
| | | | | 345/520 |
| 2016/0071322 | A1* | 3/2016 | Nishiyama | G06T 19/00 |
| | | | | 345/632 |
| 2016/0104299 | A1* | 4/2016 | George | G06K 9/6202 |
| | | | | 382/199 |
| 2016/0180510 | A1* | 6/2016 | Grau | G06T 7/80 |
| | | | | 348/47 |
| 2016/0292533 | A1* | 10/2016 | Uchiyama | G06T 7/593 |
| 2016/0342850 | A1 | 11/2016 | Elimalech et al. | |
| 2017/0228885 | A1* | 8/2017 | Baumgartner | G01B 11/04 |
| 2017/0236024 | A1* | 8/2017 | Wang | G06K 9/00201 |
| | | | | 382/201 |
| 2017/0251143 | A1* | 8/2017 | Peruch | G06T 17/00 |
| 2017/0280125 | A1 | 9/2017 | Brown et al. | |
| 2018/0053305 | A1 | 2/2018 | Gu et al. | |
| 2018/0067487 | A1 | 3/2018 | Xu et al. | |
| 2018/0130255 | A1* | 5/2018 | Hazeghi | H04N 13/243 |
| 2018/0143003 | A1 | 5/2018 | Clayton et al. | |
| 2018/0148047 | A1 | 5/2018 | Kadetotad et al. | |
| 2018/0218513 | A1* | 8/2018 | Ho | G06T 7/73 |
| 2018/0329418 | A1 | 11/2018 | Baalke et al. | |
| 2019/0025852 | A1* | 1/2019 | Nanda | B65G 1/1378 |
| 2019/0108653 | A1* | 4/2019 | Virodov | G06T 7/85 |
| 2019/0128670 | A1* | 5/2019 | Chen | G06T 7/579 |
| 2019/0141308 | A1* | 5/2019 | Swope | H04N 13/189 |
| 2019/0141312 | A1* | 5/2019 | Swope | G06T 7/62 |
| 2019/0213389 | A1* | 7/2019 | Peruch | G06T 7/11 |
| 2019/0253695 | A1* | 8/2019 | Festa | G06T 7/586 |
| 2019/0340461 | A1* | 11/2019 | Li | G06T 7/50 |
| 2020/0066028 | A1* | 2/2020 | Umemura | G06T 15/20 |

OTHER PUBLICATIONS

ForkAlert http://www.forkalert.net/ [retrieved on Sep. 6, 2018] (2017).

International Search Report and Written Opinion for International Patent Application No. PCT/US2019/033363 dated Jun. 9, 2019.

* cited by examiner

DATA CAPTURE SYSTEM AND METHOD FOR OBJECT DIMENSIONING

BACKGROUND

The transportation and storage of objects such as packages may require knowledge of the dimensions of a package. Such information may be employed to optimize the use of available space in a container (e.g. a trailer), to determine a shipping or storage cost for the package, or the like. Package dimensions, however, may not be known in advance, and workers may therefore be required to obtain package dimensions by manually measuring the packages. Taking manual measurements can be time-consuming and error-prone. Systems for automatically measuring package dimensions may also suffer from reduced accuracy, for example, when measuring packages in motion, packages with dark (e.g. black) surfaces, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a data capture system for object dimensioning, including: a motion sensor configured to generate a detection signal responsive to detecting an object at a capture position within a capture volume; a capture controller connected to the motion sensor and configured, responsive to receiving the detection signal, to generate and transmit a shutter command substantially simultaneously to each of a plurality of cameras that causes each camera to capture a respective image of a synchronous set of images of the capture volume; an image processing server connected to each of the plurality of cameras and configured to receive the synchronous set of images from the cameras, and to store the synchronous set of images in a common repository; the image processing server further configured to generate a point cloud representing the object based on the synchronous set of images, for use in determining dimensions of the object.

Additional examples disclosed herein are directed to a method of object dimensioning in a data capture system, the method including: generating, at a motion sensor, a detection signal responsive to detecting an object at a capture position within a capture volume; responsive to receiving the detection signal at a capture controller connected to the motion sensor, generating and transmitting a shutter command substantially simultaneously from the capture controller to each of a plurality of cameras that causes each camera to capture a respective image of a synchronous set of images of the capture volume; at an image processing server connected to each of the plurality of cameras, receiving the synchronous set of images from the cameras, and storing the synchronous set of images in a common repository; and at the image processing server, generating a point cloud representing the object based on the synchronous set of images, for use in determining dimensions of the object.

Figure 1:
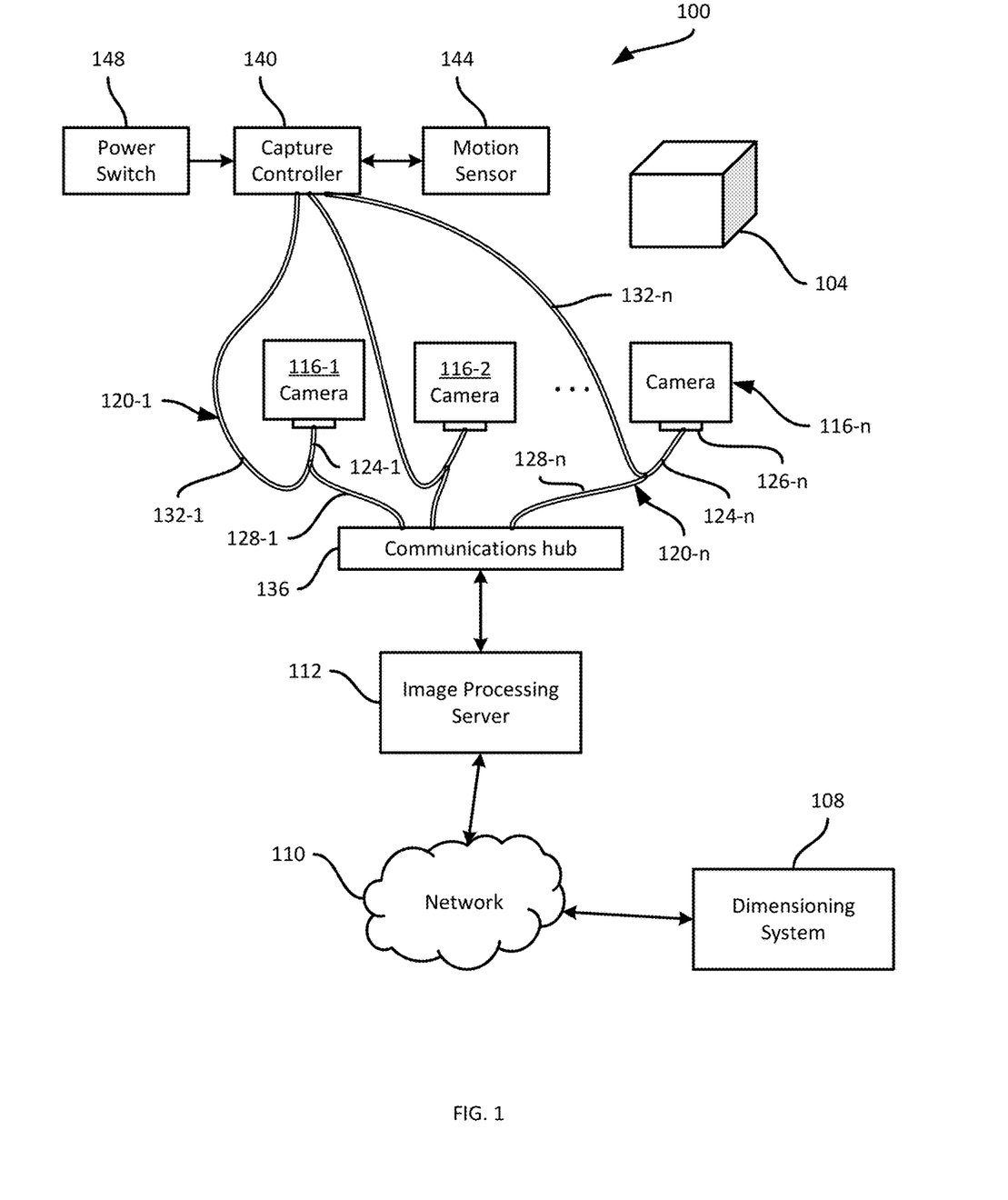
FIG. 1 is a schematic of a data capture system for object dimensioning.

FIG. 1 depicts a data capture system 100 for object dimensioning. The data capture system 100 is configured to generate point cloud data depicting an object 104 within a capture volume, and to provide the point cloud data to a dimensioning system 108 (e.g. one or more computing devices) via a network 110. The dimensioning system 108, in turn, is configured to process the point cloud data and determine at least one dimension (e.g. height, width, length or the like) of the object 104.

The object 104, in the present example, is a package and is therefore also referred to herein as the package 104. For example, the package 104 may be one of a plurality of packages to be dimensioned by the system 108 prior to shipping, storage or the like. The system 100 may, for example, be deployed in a transport and logistics (T&L) facility in which a plurality of packages 104 are moved through the system 100 for data capture and subsequent dimensioning.

The system 100 includes an image processing server 112 (also referred to herein as the server 112) configured to generate the above-mentioned point cloud data representing the package 104. The image processing server 112 is implemented as a suitable computing device, the components of which will be described in greater detail below.

The server 112 is configured to generate the above-mentioned point cloud data representing the package 104 based on a synchronous set of images captured by a plurality of cameras 116-1, 116-2, ..., 116-n (collectively referred to as the cameras 116, and generically referred to as a camera 116; similar nomenclature is employed for other elements herein) arranged with fields of view encompassing a capture volume containing the package 104. The cameras 116, in the present example, are color cameras (e.g. configured to generate images files containing RGB data), such as digital single-lens reflex (DSLR) cameras. In other examples, the cameras 116 can include one or more grayscale cameras, infrared cameras, or the like. In addition, camera formats other than the above-mentioned DSLR format may be implemented.

A synchronous set of images as referred to herein contains one image captured by each camera, at substantially the same time. For example, the images in a synchronous set of images may be captured within a time period of about 0.5 seconds or less. In some embodiments, the images in a synchronous set of images may be captured within a time period of about 0.2 seconds or less. Thus, each image in the set depicts the package 104 at substantially the same instant in time, but from a different viewing position than the other images as a result of the differing physical positions of the cameras 116 relative to the capture volume.

The images employed by the server 112 to generate point cloud data are transferred to the server 112 by the cameras 116, in the present example, via a set of dual connectors 120-1, 120-2, . . . , 120-n. Each dual connector 120 includes a camera segment 124 configured to engage with a communications port 126 of the corresponding camera 116. The communications port 126 includes a set of control contacts (e.g. pins or other suitable electrical contacts) and a set of data transfer contacts. For example, the data transfer contacts can be based on the Universal Serial Bus (USB) standard. An example of a communications port 126 is a Sony' Multiport (also referred to as Multi Terminal) port, which includes five USB contacts and ten control contacts.

The camera segment 124 of each dual connector 120 includes electrical conduits corresponding to both the above-mentioned data transfer contacts and control contacts. Each dual connector 120 also includes a transfer segment 128 and a control segment 132. As shown in FIG. 1, the segments 128 and 132 split from the camera segment 124. In particular, the transfer segment 128 contains the above-mentioned data transfer conduits, while the control segment 132 contains the above-mentioned control conduits.

In embodiment illustrated in FIG. 1, therefore, the cameras 116 are configured to transfer captured images to the server 112 via the dual connectors 120 (and specifically via the camera segments 124 and the transfer segments 128). The system 100 also includes a communications hub 136, such as a USB hub, connecting the transfer segments 128 to the server 112 (e.g. to a single USB port of the server 112). In other examples, the communications hub 136 is omitted and the transfer segments 128 are connected directly to the server 112, for example where the server 112 includes a sufficient number of ports (e.g. USB ports) to accommodate the transfer segments 128.

The cameras 116 are configured to capture images responsive to commands issued to the cameras over the control segments 132 of the dual connectors 120. In particular, the system 100 includes a capture controller 140 configured to receive each of the control segments 132, and to transmit commands over the control segments 132 to the cameras 116.

The capture controller 140 is implemented as a suitable computing device, such as one or more single-board microcontrollers (e.g. Raspberry Pi™). In other examples, the controller 140 can be implemented as a desktop computer, a laptop computer, a tablet computer, or the like. The capture controller 140 is configured to generate control signals for transmission to the cameras 116, including a synchronous shutter command that is generated in response to an object detection signal received at the controller 140.

The object detection signal, in the present example, is generated by a motion sensor 144 configured to detect the arrival of the package 104 in the capture volume. The motion sensor 144 includes any suitable motion sensing device, such as a light detection and ranging (lidar) device, an ultrasound sensor, a further camera and associated image processor configured to detect the presence of the package 104, or the like. The motion sensor 144 is connected to the controller 140 via a suitable communications link (e.g. USB, I2C interface, or the like).

The system 100 also includes a power switch 148 connected to the capture controller 140. The power switch 148 is, in the present example, a manually operable switch configured to cause the controller 140 to send control commands to the cameras 116 to power on or off. The controller 140 can also be configured to power the motion sensor 144 on or off responsive to operation of the power switch 148. In other embodiments, the power switch 148 can be omitted or replaced with a soft switch implemented in software executed by the controller 140 and operated via manipulation of an input device (e.g. a keyboard, touch screen, microphone or the like).

Figure 2:
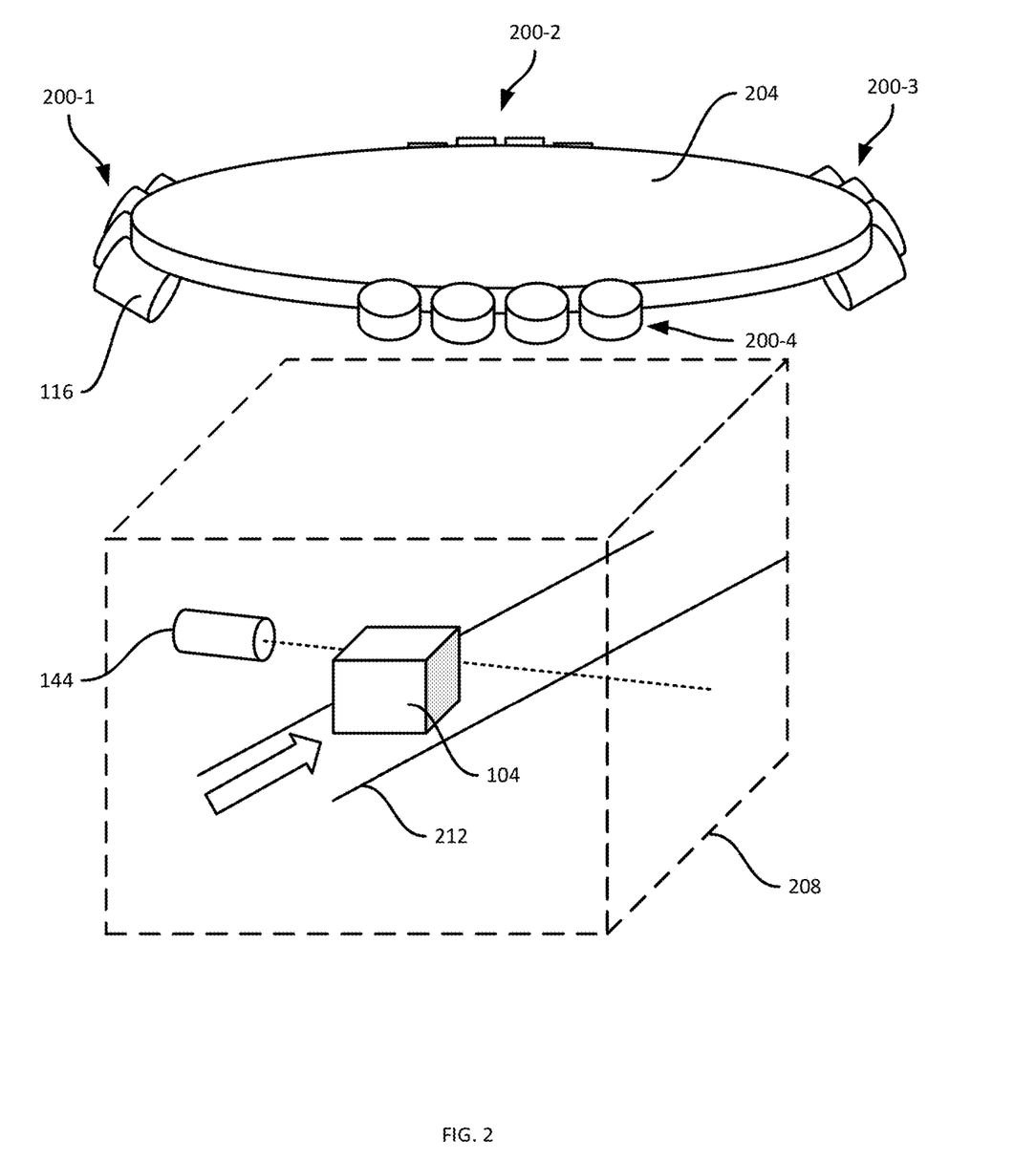
FIG. 2 is a diagram of an example deployment of certain components of the system of FIG. 1.

Turning to FIG. 2, certain components of the system 100 are shown in an example deployment. The example deployment shown in FIG. 2 includes sixteen cameras 116, arranged in four groups 200-1, 200-2, 200-3 and 200-4, with each group 200 including four cameras 116. As will be apparent from FIG. 2, the spacing of the cameras 116 within each group 200 is smaller than the spacing between adjacent groups 200.

The cameras 116 are supported on a support structure 204 (e.g. about the perimeter of the support structure 204), such as a substantially annular frame, which may be suspended from a ceiling (not shown) of the facility in which the system 100 is deployed. A wide variety of other support structures may also be employed to support the cameras 116, including discrete support structures for each group 200, or for each camera 116. In other embodiments, the cameras 116 are equally spaced about the support structure 204. In further embodiments, other numbers of cameras 116 may be deployed. For example, another deployment may employ twelve cameras 116 disposed about the support structure 204 in three groups of four, or in four groups of three.

The cameras 116 are positioned by the support structure 204 such that the field of view of each camera 116 encompasses at least a portion of a capture volume 208. Further, the fields of view of adjacent cameras 116 within each group 200 overlap by about 40%. Together, the cameras 116 thus provide substantially complete coverage of the capture volume 208 (e.g. each position in the capture volume 208 is within the field of view of at least two cameras 116). In the present example, the capture volume 208 has a height, a width and a length of about eight feet each; the cameras 116 may be arranged to encompass various other capture volumes in other embodiments, for example depending on the size of package 104 to be captured.

The package 104 may be transported through the capture volume 208, for example on a conveyor belt 212 or other locomotive mechanism (e.g. in a grasping assembly of a vehicle). The motion sensor 144 is therefore deployed, as shown in FIG. 2, in the path along which the package 104 is transported, to detect the arrival of the package 104 at a predefined capture position within the capture volume 208. Upon arrival of the package 104 at the capture position, the motion sensor 144 is configured to generate the above-mentioned detection signal.

Before a detailed discussion of the operation of the system 100, certain internal components of the server 112 and the controller 140 will be discussed with reference to FIGS. 3A and 3B.

Figure 3A:
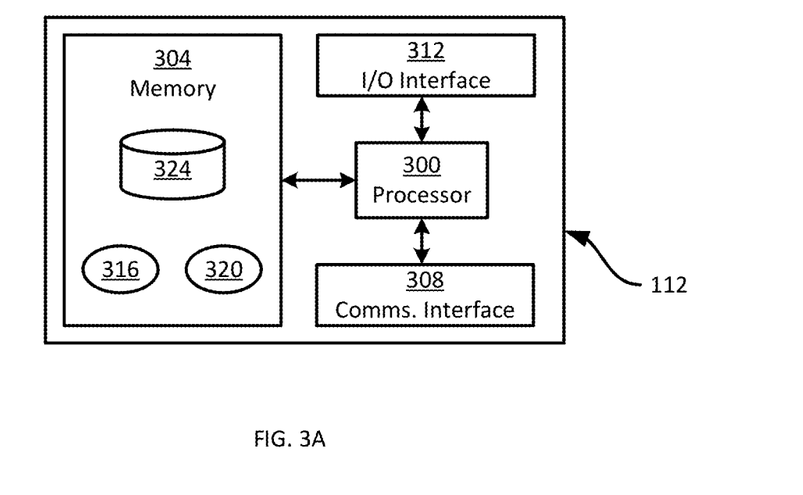
FIG. 3A is a block diagram of certain internal components of the image processing server of FIG. 1.

Referring to FIG. 3A, certain internal components of the server 112 are shown. The server 112 includes a central processing unit (CPU), also referred to as a processor 300, interconnected with a non-transitory computer readable storage medium, such as a memory 304. The memory 304 includes any suitable combination of volatile (e.g. Random Access Memory (RAM)) and non-volatile (e.g. read only memory (ROM), Electrically Erasable Programmable Read Only Memory (EEPROM), flash) memory. The processor 300 and the memory 304 each comprise one or more integrated circuits (ICs).

The server 112 also includes a communications interface 308, enabling the server 112 to exchange data with other computing devices, such as the dimensioning system 108, via the network 110. The communications interface 308 therefore includes any suitable hardware (e.g. transmitters, receivers, network interface controllers and the like) allowing the server 112 to communicate over the network 110.

The server 112 further includes an input/output interface 312, which may also be referred to as a local communications interface, enabling the server 112 to exchange data with devices such as the cameras 116. In the present example, the interface 312 includes a USB interface connected to the hub 136. Other suitable interface technologies may also be employed for the interface 312, including Ethernet, Wi-Fi, Thunderbolt™ and the like).

The server 112 can also include input devices (e.g. a keyboard, a mouse, a microphone, or the like) and output devices (e.g. a display, a speaker or the like), not shown. The components of the server 112 are interconnected by communication buses (not shown), and powered by a battery or other power source, over the above-mentioned communication buses or by distinct power buses (not shown).

The memory 304 of the server 112 stores a plurality of applications, each including a plurality of computer readable instructions executable by the processor 300. The execution of the above-mentioned instructions by the processor 300 causes the server 112 to implement certain functionality, as discussed herein. The applications are therefore said to be configured to perform that functionality in the discussion below. In the present example, the memory 304 of the server 112 stores a monitoring application 316, and a point cloud generator application 320 (also referred to herein simply as the applications 316 and 320, respectively).

The server 112 is configured, via execution of the application 316 by the processor 300, to monitor the contents of a common image repository 324 in the memory 304 (e.g. a database, folder or the like) for changes thereto, and to cause the point cloud generator application 320 to initiate point cloud generation based on the contents of the repository 324 when changes are detected. The application 320 is a suitable point cloud generation application, such as Agisoft Photo-Scan.

The applications 316 and 320 can, in other examples, be implemented as a single application, or as more than two applications. In other examples, the processor 300, as configured by the execution of the applications 316 and 320, is implemented as one or more specifically-configured hardware elements, such as field-programmable gate arrays (FPGAs) and/or application-specific integrated circuits (ASICs).

Figure 3B:
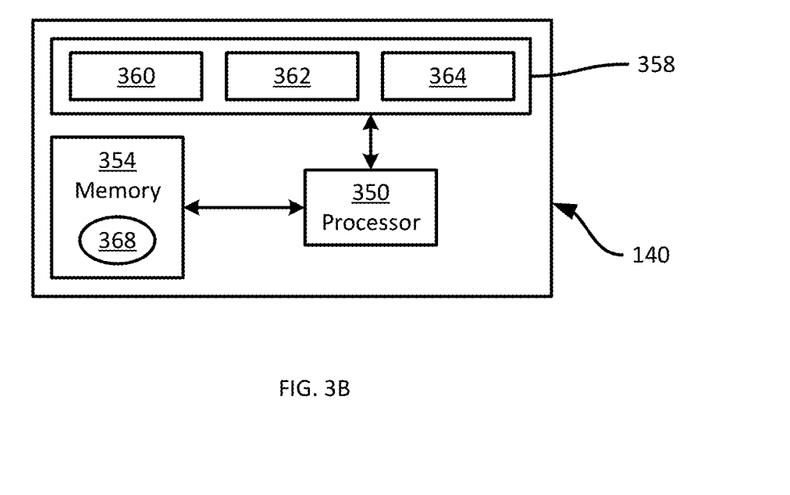
FIG. 3B is a block diagram of certain internal components of the capture controller of FIG. 1.

Referring to FIG. 3B, certain internal components of the controller 140 are shown. The controller 140 includes a central processing unit (CPU), also referred to as a processor 350, interconnected with a non-transitory computer readable storage medium, such as a memory 354. The memory 354 includes any suitable combination of volatile (e.g. Random Access Memory (RAM)) and non-volatile (e.g. read only memory (ROM), Electrically Erasable Programmable Read Only Memory (EEPROM), flash) memory. The processor 350 and the memory 354 each comprise one or more integrated circuits (ICs).

The controller 140 further includes an input/output interface 358, enabling the controller 140 to exchange data with devices such as the cameras 116 and the motion sensor 144. In the present example, the interface 358 includes an array of general purpose input/output (GPIO) pins (e.g. at least one set of 40 GPIO pins). The interface 358 can also include one or more USB ports or the like. A first portion 360 of the interface 358 (e.g. a first subset of the GPIO pins) is connected to the power switch 148. A second portion 362 of the interface 358 (e.g. a second subset of the GPIO pins, or a USB port) is connected to the motion sensor 144. A third portion 364 of the interface 358 (e.g. a third subset of the GPIO pins) is connected to the cameras 116. That is, the third portion 364 establishes connections between the controller 140 and the control segment 132 of each dual connector 120. Thus, in the present example, the third portion 364 establishes sixteen connections (to each of the sixteen cameras 116), each connection having a sufficient number of contacts (e.g. GPIO pins) to transmit the commands discussed in greater detail below to the cameras 116.

The controller 140 can also include a further communications interface (not shown) including a suitable combination of transmitters, receivers, network interface controllers and the like, and enabling the controller 140 to communicate with other computing devices, e.g. via the network 110.

The controller 140 can also include input devices (e.g. a keyboard, a mouse, a microphone, or the like) and output devices (e.g. a display, a speaker or the like), not shown. The components of the controller 140 are interconnected by communication buses (not shown), and powered by a battery or other power source, over the above-mentioned communication buses or by distinct power buses (not shown).

The memory 354 of the controller 140 stores a plurality of applications, each including a plurality of computer readable instructions executable by the processor 350. The execution of the above-mentioned instructions by the processor 350 causes the controller 140 to implement certain functionality, as discussed herein. The applications are therefore said to be configured to perform that functionality in the discussion below. In the present example, the memory 354 of the controller 140 stores a capture control application 368 (also referred to herein as the application 368).

The controller 140 is configured, via execution of the application 368 by the processor 350, to receive object detection signals from the motion sensor 144, and in response to control the cameras 116 to capture images and transfer the images to the server 112 for storage in the repository 324 and generation of a point cloud.

The application 368 can, in other examples, be implemented as a plurality of logically distinct applications. In other examples, the processor 350, as configured by the execution of the application 368, is implemented as one or more specifically-configured hardware elements, such as field-programmable gate arrays (FPGAs) and/or application-specific integrated circuits (ASICs).

Figure 4:
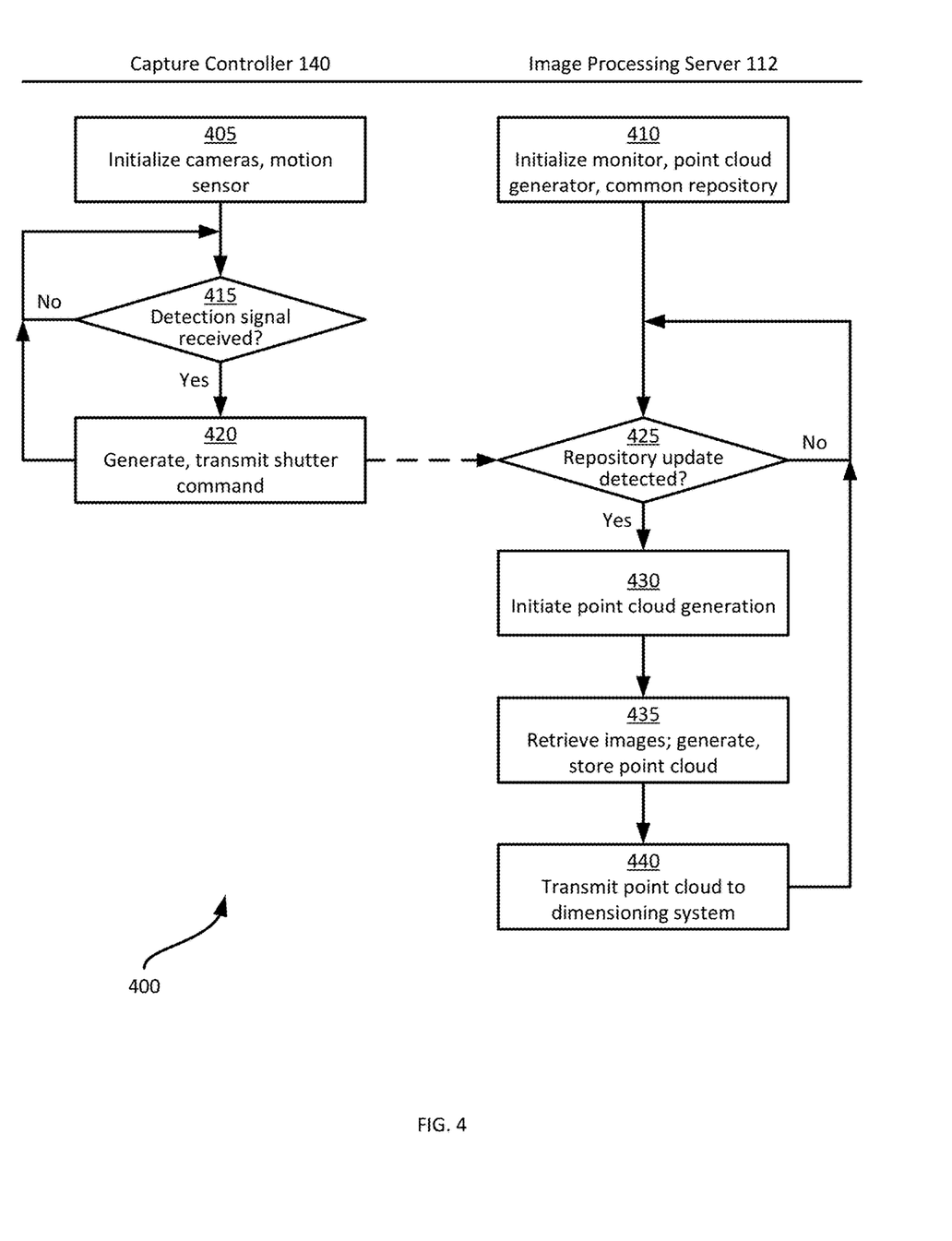
FIG. 4 is a flowchart of a method of data capture for object dimensioning.

Turning now to FIG. 4, a method 400 of data capture for object dimensioning is illustrated. The method 400 will be described in conjunction with its performance in the system 100, as discussed above in connection with FIGS. 1, 2 and 3A-3B. In particular, the method 400 illustrates actions taken by the capture controller 140 and the server 112 to capture images of a package 104 within the capture volume 208, and to generate a point cloud representing the package 104 for transmission to the dimensioning system 108.

Beginning at block 405, the controller 140 is configured, via execution of the application 368 to initialize the cameras 116 and the motion sensor 144. For example, the controller 140 is configured to detect an activation of the power switch 148 (e.g. via the first portion 360 of the interface 358) and in response, to transmit power-on commands to the motion sensor 144 (e.g. via the second portion 362 of the interface 358) and each of the cameras 116 (e.g. via the third portion 364 of the interface 358).

At block 410, the server 112 is configured to initiate execution of the monitor application 316 and the point cloud generator application 320. Initiation of execution of the point cloud generator application 320 may include loading of calibration data corresponding to the cameras 116. The calibration data defines the physical positions and orientations (e.g. pitch, roll and yaw) of the cameras 116 relative to a predefined frame of reference (e.g. a coordinate system representing the capture volume 208).

The server 112 may also be configured at block 410, along with initiating execution of the application 320, to initialize the common repository 324. More specifically, the server 112 can be configured to populate the repository 324 with an initial set of images representing the capture volume 208. The initial set of images may represent the capture volume 208 in the absence of a package 104. Various mechanisms can be implemented to initialize the repository 324. For example, a static set of initial images can be stored in the memory 304, and at block 410 the server 112 can be configured (e.g. via execution of the application 320) to clear the contents of the repository 324 and write a copy of the initial image set into the repository. In another example, the controller 140 can be configured, upon detection of an activation of the power switch 148, to not only send a power-on command to the cameras 116, but to also send a shutter command to the cameras 116, causing the cameras to capture an initial image set and transfer the initial image set to the server 112 for storage in the repository 324.

When the repository 324 is initialized at block 410, the server 112 can also be configured to generate an initial point cloud based on the initial image set in the repository 324. Generation of a point cloud from a set of two-dimensional images is performed according to any suitable conventional mechanism, and is not discussed in detail herein. The initial point cloud, when generated, is stored in the memory 304 (e.g. in the repository 324). The initialization of the repository 324 and the generation of an initial point cloud as described above may accelerate the generation of point cloud data representing packages 104 later in the performance of the method 400. For example, the application 320 may be configured to generate subsequent point cloud data by detecting portions of subsequent image sets that match the initial point cloud and re-using corresponding portions of the initial point cloud. In other embodiments, initialization of the repository 324 and generation of an initial point cloud at block 410 can be omitted.

At block 415, having initialized the cameras 116 and the motion sensor 144, the controller 140 is configured to determine whether an object detection signal has been received from the motion sensor 144 indicating the presence of an object (e.g. the package 104) at a capture position within a capture volume. Referring briefly to FIG. 2, such a detection signal is generated by the motion sensor 144 when the package 104 breaks the beam of light (e.g. laser, IR, or the like) emitted by the motion sensor 144.

When the determination at block 415 is negative, the controller 140 is configured to repeat the performance of block 415. When the determination at block 415 is affirmative, however, the controller 140 is configured to proceed to block 420. At block 420, the controller 140 is configured to generate a shutter command and transmit the shutter command to each camera 116. More specifically, the shutter command is applied substantially simultaneously to every control segment 132 connected to the third portion 364 of the interface 358, such that the cameras 116 receive the shutter command at substantially the same time. For example, the cameras 116 can receive the shutter command within a total time period of about 0.2 seconds, as noted earlier. The time period over which every camera 116 receives the shutter command may be selected based in part on the speed at which the object 104 moves through the capture volume (e.g. on the conveyor 212). As will be apparent to those skilled in the art, greater speeds of movement of the package 104 may require that the shutter command be received at all cameras 116 within a shorter time period. The example time periods mentioned herein correspond to package movement speeds of up to about 8 mph.

The nature of the shutter command is dependent on the capabilities of the cameras 116. For example, the port 126 of each camera may include shutter control contacts, as well as auto-focus contacts, flash activation contacts, and the like. The control segments 132 include conduits corresponding to the above-mentioned contacts, and the shutter command can therefore include a signal applied to one or more of the conduits (e.g. a high voltage to indicate activation of a shutter, flash or the like, or a low voltage to indicate non-activation). In the present example, the shutter command includes a shutter activation signal and an auto-focus activation signal, instructing each camera 116 to simultaneously trigger the auto-focus and shutter.

Having generated and transmitted the shutter command, the controller 140 is configured to return to block 415 and monitor for further object detection signals. As will now be apparent to those skilled in the art, for some configurations of the motion sensor 144, a given package 104 may cause the generation of more than one detection signal by the motion sensor 144. The controller 140 can therefore be configured to resume monitoring at block 415 following a performance of block 420 after a predefined time period, to permit the package 104 to clear the detection range of the motion sensor 144. For example, for a capture volume 208 having a length of about 8 feet as mentioned above, and a conveyor 212 configured to transport objects through the capture volume 208 at a speed of about 8 mph, the controller 140 can be configured to ignore any detection signals received from the motion sensor within about 0.3 seconds of a performance of block 420.

Responsive to the performance of block 420 by the controller 140, each camera 116, upon receiving the shutter command, is configured to execute the shutter command (e.g. by activating auto-focus and the shutter, as mentioned above) to capture an image. Each camera 116 is further configured to automatically transfer the captured image to the server 112 via the corresponding camera segment 124 and the transfer segment 128. Thus, in the present example, the server 112 is configured to receive a synchronous set of images for storage in the repository 324 via the communications hub 136.

In the present example, each camera 116 is also configured to assign a static file name, specific to that camera 116, to any captured images. That is, each set of synchronous images captured by the cameras bears the same set of file names. Thus, the transfer of the captured images in each synchronous image set to the repository 324 overwrites the previous set of images stored in the repository 324. Overwriting the files in the repository 324 rather than writing new files to the repository 324 may accelerate post-processing of the images, for example by permitting the point cloud generator to maintain a static list of file names to be processed rather than performing a discovery process prior to processing each set of images.

Figure 5:
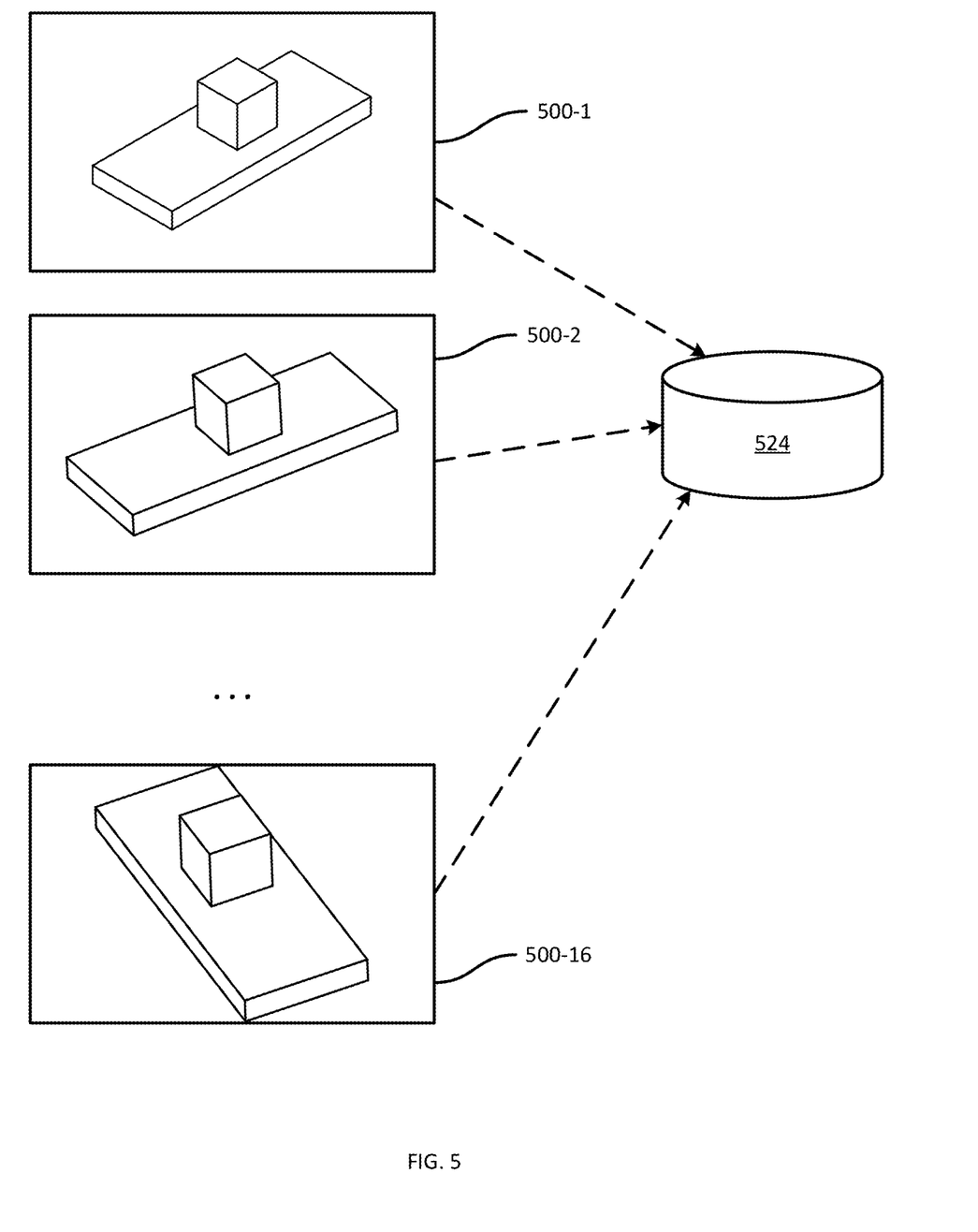
FIG. 5 illustrates example images captured via performance of the method of FIG. 4 in the system of FIGS. 1 and 2.

Turning briefly to FIG. 5, a synchronous set of images 500-1, 500-2, . . . , 500-16 (i.e. one image per camera 116) is shown being transferred to the repository 324 responsive to the shutter command generated and sent at block 420. As is apparent from FIG. 5, the images 500 depict the package 104 from a plurality of perspectives, determined by the positions and orientations at which the cameras 116 are supported by the support structure 204.

Returning to FIG. 4, at block 425, following the initialization discussed above in connection with block 410, the server 112 is configured to determine whether the contents of the repository 324 has been updated. As seen in FIG. 1, the shutter command does not reach the server 112 directly, and the server 112 is therefore configured to detect that images have been captured indirectly. In particular, the monitoring application 316 is configured to determine whether the repository 324 has been updated. In the present example, in which each camera 116 is configured to assign a static file name to captured images, the monitoring application 316 is configured to determine whether the repository 324 has been updated by inspecting timestamps associated with the files stored in the repository 324. For example, Table 1 illustrates a listing of the contents of the repository 324 prior to a performance of block 420 (e.g. following initialization of the repository 324), while Table 2 illustrates a listing of the contents of the repository 324 after the performance of block 420.

TABLE 1

Initial Contents of Repository 324

| File Name | Date/Time Modified |
|---|---|
| IMG_Camera_1.jpg | May 1, 2018 10:01:15.9 AM |
| IMG_Camera_2.jpg | May 1, 2018 10:01:15.9 AM |
| . . . | . . . |
| IMG_Camera_15.jpg | May 1, 2018 10:01:16.2 AM |
| IMG_Camera_16.jpg | May 1, 2018 10:01:16.2 AM |

TABLE 2

Updated Contents of Repository 324

| File Name | Date/Time Modified |
|---|---|
| IMG_Camera_1.jpg | May 1, 2018 10:01:16.7 AM |
| IMG_Camera_2.jpg | May 1, 2018 10:01:16.7 AM |
| . . . | . . . |
| IMG_Camera_15.jpg | May 1, 2018 10:01:16.9 AM |
| IMG_Camera_16.jpg | May 1, 2018 10:01:16.2 AM |

As seen above, in both instances the repository 324 contains images having the same file names. However, in Table 2 all but one of the images ("IMG_Camera_16.jpg") bears a different timestamp than those shown in Table 1. The updated timestamps indicate that those images have been overwritten following a performance of block 420 by the controller 140 (which leads to image captures by each camera 116, and transfer of the images to the repository 324). At block 425, the monitoring application 316 is configured to make an affirmative determination only when every image has been overwritten (i.e. when an entire new synchronous set of images has been received). Thus, in the example represented by Tables 1 and 2 above, the determination at block 425 is negative, until the final image is received, leading to an update to the timestamp for the image "IMG_Camera_16.jpg". In other embodiments, the monitoring application 316 is configured to make an affirmative determination when any one of the images in the repository 324 is updated.

In further embodiments, the determination at block 425 need not rely on the detection of timestamp updates. For example, in embodiments in which the images are not written to the repository 324 with static file names, the monitoring application 316 is configured to make an affirmative determination upon detecting new file names in the repository (e.g. at least one new file, a predetermined number of new files, or the like). In further embodiments, the server 112 is configured to examine other suitable metadata associated with the captured images to detect updates to the repository 324. For example, the server 112 can be configured to detect changes in file sizes at block 425.

When the determination at block 425 is negative, the monitoring application 316 continues to monitor the repository 324 for updates. When the determination at block 425 is affirmative, the performance of the method 400 proceeds to block 430. At block 430, the monitoring application 316 is configured to generate a command to the point cloud generator application 320 to initiate generation of point cloud data based on the set of images detected at block 425. The generation of point cloud data, as noted earlier, is performed via a suitable point cloud generation mechanism and is not discussed in detail herein. In general, the generation of point cloud data at block 435 includes the generation of a plurality of voxels each containing color data (e.g. red, green and blue values, or values corresponding to another suitable color model) and positional data in three dimensions. The positional and color data for the voxels are derived from the images in the synchronous set based on the above-mentioned calibration data. The calibration data is employed to determine positions within the capture volume 208 that are represented by each pixel of each image. In other words, three-dimensional positions may be generated for each pixel in the images. Each distinct three-dimensional position may be stored in a voxel, and color data may be assigned to the voxel based on the color data from one or more pixels corresponding to the three-dimensional position.

The point cloud data generated at block 435 is stored in the memory 304. For example, the point cloud data can be stored in the repository 324, or in a separate repository defined in the memory 304. In examples in which an initial point cloud is generated, the point cloud data generated at block 435 is stored separately from the initial point cloud. However, subsequent performances of block 435 may lead to point cloud data from previous performances of block 435 being overwritten.

At block 440, the point cloud data generated at block 435 is employed to obtain dimensions for the package 104. In the present example, the server 112 is configured to transmit the point cloud data transmitted to the dimensioning system 108 via the network 110, and the dimensioning system 108 is configured to detect the representation of the package 104 in the point cloud data and to determine dimensions for the package 104. In other examples, some or all of the functionality of the dimensioning system 108 is implemented within the server 112. For example, the server 112 can include a dimensioning application (not shown) configured to detect edges or other features within the point cloud data and compute the dimensions of such features. The dimensions obtained from the point cloud data may be returned to the server 112, presented on a display coupled to the server 112 or the dimensioning system 108, or the like. The dimensions may also be transmitted to a further computing device, for example for the determination of transport or storage pricing, for spatial optimization processing or the like.

Following the performance of block 440, the server 112 is configured to return to block 425, at which the monitoring application 316 continues to monitor the contents of the repository 324 for further updates.

Variations to the above systems and methods are contemplated. For example, in some embodiments the dual connectors 120 may be omitted. In such embodiments, connections between the cameras 116 and the server 112 may be implemented according to a suitable wired (e.g. USB, Thunderbolt™) or wireless (e.g. Bluetooth™, Wi-Fi) connection. Connections between the cameras 116 and the controller 140 may be implemented according to another suitable wired or wireless connection.

In some embodiments, the controller 140 is implemented as two or more physical devices, for example when the interface 358 of a single device does not include a sufficient number of contacts to establish connections with all of the cameras 116, as well as the power switch 148 and the motion sensor 144. In such embodiments, each segment 132 may be split into two or more segment, with certain control conduits (e.g. shutter and auto-focus) being connected to a first controller 140, and other control conduits (e.g. power switching for the cameras 116) being connected to a second controller 140. The controllers 140 are in communication with one another in such embodiments, for example via a wired (e.g. Ethernet) or wireless (e.g. Wi-Fi, Bluetooth™) connection.

Figure 6:
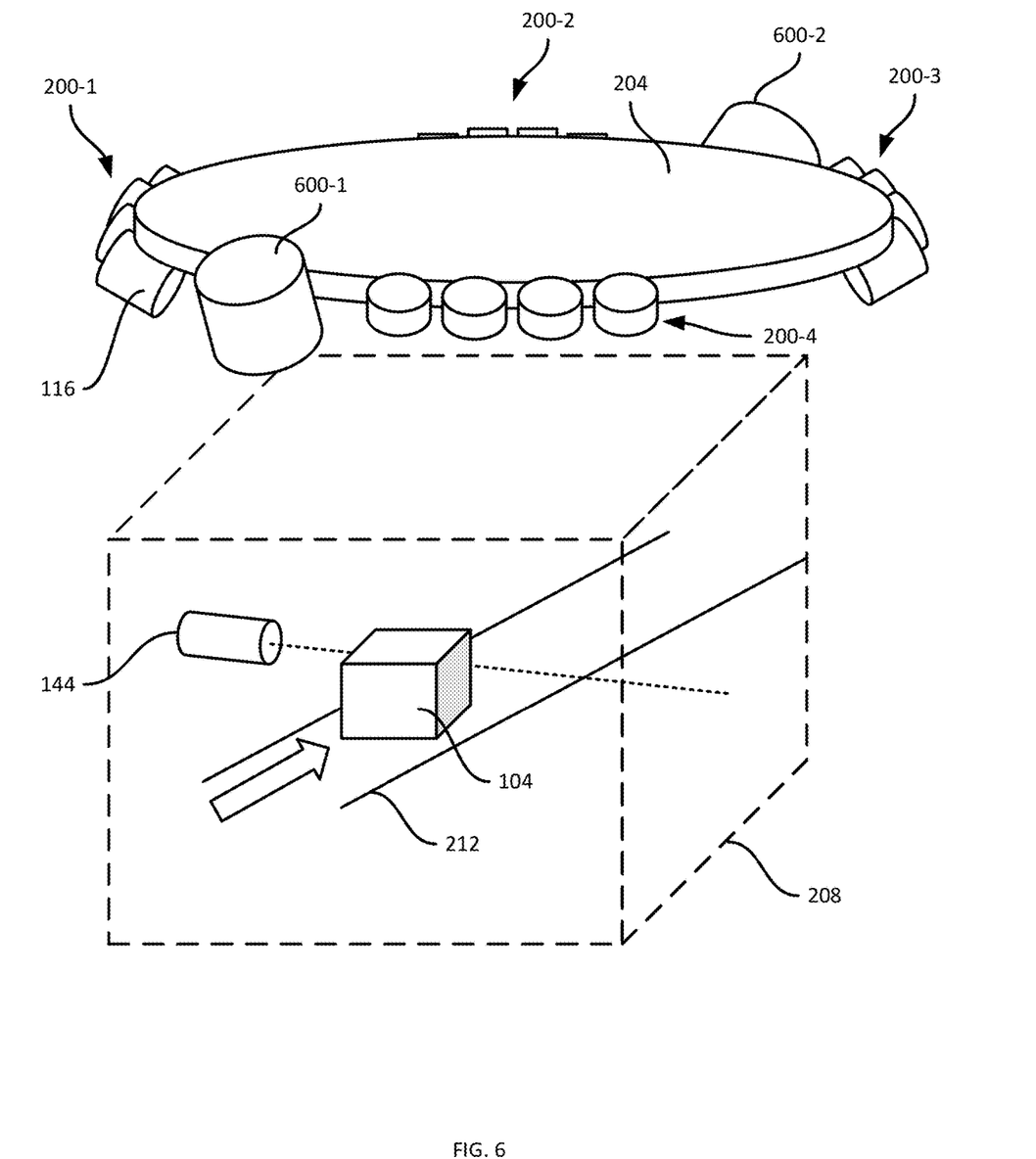
FIG. 6 is a diagram of another example deployment of certain components of the system of FIG. 1.

In further embodiments, the system 100 includes one or more projectors arranged to illuminate the capture volume 208, for example with structured light detectable by the cameras 116. For example, as shown in FIG. 6, the system 100 may include a first projector 600-1 and a second projector 600-2 supported by the support structure 204 to illuminate the capture volume 208.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A data capture system for object dimensioning, comprising:
a motion sensor configured to generate a detection signal responsive to detecting an object at a capture position within a capture volume;
a capture controller connected to the motion sensor and configured, responsive to receiving the detection signal, to generate and transmit a shutter command substantially simultaneously to each of a plurality of cameras that causes each camera to capture a respective image of a synchronous set of images of the capture volume;
an image processing server connected to each of the plurality of cameras and configured to receive the synchronous set of images from the cameras, and to store the synchronous set of images in a common repository;
the image processing server further configured to generate a point cloud representing the object based on the synchronous set of images, for use in determining dimensions of the object,
wherein the capture controller is further configured, responsive to receiving a further detection signal, to generate and transmit a further shutter command to each of the plurality of cameras for causing the cameras to capture respective further images; and
wherein the image processing server is further configured to monitor the common repository to detect the further images, and to generate a further point cloud based on the further images,
the further images having common file names with the images; wherein the image processing server is configured to monitor the common repository to detect the further images by detecting changes in timestamps associated with the common file names and to generate the further point cloud responsive to detecting the changes in the timestamps.

2. The data capture system of claim 1, the image processing server further configured to transmit the point cloud to a dimensioning system configured to determine the dimensions of the object based on the point cloud.

3. The data capture system of claim 1, further comprising a support structure configured to support the plurality of cameras adjacent to the capture volume.

4. The data capture system of claim 3, wherein the plurality of cameras comprises a plurality of camera groups spaced apart on a perimeter of the support structure.

5. The data capture system of claim 3, wherein the support structure is an annular support structure disposed above the capture volume.

6. The data capture system of claim 1, further comprising a plurality of dual connectors extending between the plurality of cameras, the image processing server and the controller;
wherein each camera includes a communications port;
wherein the capture controller is connected to the communications port of each camera via a first segment of a respective dual connector; and
wherein the server is connected to the communications port of each camera via a second segment of the respective dual connector.

7. The data capture system of claim 1, further comprising a projector configured to illuminate the capture volume.

8. The data capture system of claim 1, further comprising a power switch connected to the capture controller; wherein the capture controller is configured, responsive to detecting activation of the power switch, to transmit a power on command to each of the plurality of cameras.

9. A method of object dimensioning in a data capture system, the method comprising:
generating, at a motion sensor, a detection signal responsive to detecting an object at a capture position within a capture volume;
responsive to receiving the detection signal at a capture controller connected to the motion sensor, generating and transmitting a shutter command substantially simultaneously from the capture controller to each of a plurality of cameras that causes each camera to capture a respective image of a synchronous set of images of the capture volume;
at an image processing server connected to each of the plurality of cameras, receiving the synchronous set of images from the cameras, and storing the synchronous set of images in a common repository;
at the image processing server, generating a point cloud representing the object based on the synchronous set of images, for use in determining dimensions of the object;
responsive to receiving a further detection signal, generating and transmitting a further shutter command to each of the plurality of cameras for causing the cameras to capture respective further images; and
at the image processing server, monitoring the common repository to detect the further images, and generating a further point cloud based on the further images,
the further images having common file names with the images, wherein the method further comprises:
at the image processing server, monitoring the common repository to detect the further images by detecting changes in timestamps associated with the common file names, and generating the further point cloud responsive to detecting the changes in the timestamps.

10. The method of claim 9, further comprising: at the image processing server, transmitting the point cloud to a dimensioning system configured to determine the dimensions of the object based on the point cloud.

11. The method of claim 9, wherein the plurality of cameras are supported by a support structure adjacent to the capture volume.

12. The method of claim 11, wherein the plurality of cameras comprises a plurality of camera groups spaced apart on a perimeter of the support structure.

13. The method of claim 11, wherein the support structure is an annular support structure disposed above the capture volume.

14. The method of claim 9, wherein the plurality of cameras, the image processing server and the capture controller are connected by a plurality of dual connectors; the method further comprising:
at the capture controller, generating and transmitting the shutter command to respective communications ports of each of the cameras via respective first segments of the dual connectors;
at the image processing server, receiving the synchronous set of images from the respective communications ports via respective second segments of the dual connectors.

15. The method of claim 9, further comprising: at a projector, illuminating the capture volume.

16. The method of claim 9, further comprising:
at the capture controller, detecting activation of a power switch; and
responsive to detecting activation of the power switch, transmitting a power on command to each of the plurality of cameras.

\* \* \* \* \*